US009875391B2

United States Patent
Liang et al.

(10) Patent No.: US 9,875,391 B2
(45) Date of Patent: Jan. 23, 2018

(54) SYSTEM AND A METHOD FOR IMAGE RECOGNITION

(71) Applicant: YUTOU TECHNOLOGY (HANGZHOU) CO., LTD., Hangzhou (CN)

(72) Inventors: Ningqing Liang, Hangzhou (CN); Mingxiu Chen, Hangzhou (CN); Hongxin Zhang, Hangzhou (CN)

(73) Assignee: Yutou Technology (Hangzhou) Co., Ltd. (CN)

( * ) Notice: Subject to any disclaimer, the term of this patent is extended or adjusted under 35 U.S.C. 154(b) by 148 days.

(21) Appl. No.: 14/763,715

(22) PCT Filed: Jun. 12, 2015

(86) PCT No.: PCT/CN2015/081403
§ 371 (c)(1),
(2) Date: Jul. 27, 2015

(87) PCT Pub. No.: WO2016/112630
PCT Pub. Date: Jul. 21, 2016

(65) Prior Publication Data
US 2016/0307027 A1    Oct. 20, 2016

(30) Foreign Application Priority Data

Jan. 12, 2015  (CN) .......................... 2015 1 0014262

(51) Int. Cl.
G06K 9/00       (2006.01)
G06K 9/62       (2006.01)
(52) U.S. Cl.
CPC ..... G06K 9/00255 (2013.01); G06K 9/00268 (2013.01); G06K 9/00288 (2013.01); G06K 9/6269 (2013.01)

(58) Field of Classification Search
None
See application file for complete search history.

(56) References Cited

U.S. PATENT DOCUMENTS 8,761,933 B2 *  6/2014  Olivier, III ........... G05D 1/0246
                                                          700/245
2002/0193908 A1* 12/2002 Parker .................... G06F 3/011
                                                          700/245

(Continued)

FOREIGN PATENT DOCUMENTS

CN    101187990 A    5/2008
CN    103106393 A    5/2013
CN    103996181 A *  8/2014

OTHER PUBLICATIONS

International Search Report and Written Opinion for International Patent Application No. PCT/CN2015/081403, dated Sep. 30, 2015, 14 pages.

(Continued)

Primary Examiner — Jayesh A Patel
(74) Attorney, Agent, or Firm — Withrow & Terranova, PLLC

(57) ABSTRACT

The invention discloses an image recognition system, comprising: a robot having an image collection module configured to drive an image collection module to collect an image in a view of the robot by the image collection drive module; a light source configured to supplement light when the image collection module collecting an image; a face detection module configured to locate a face image in an image according to the image collected by the image collection module; a face recognition module configured to implement a preprocessing for the located face image, then the preprocessed face image being compared with an image feature information of a known identity in a database, to determine an identity information and a confidence probability of the (Continued)

Figure 1:
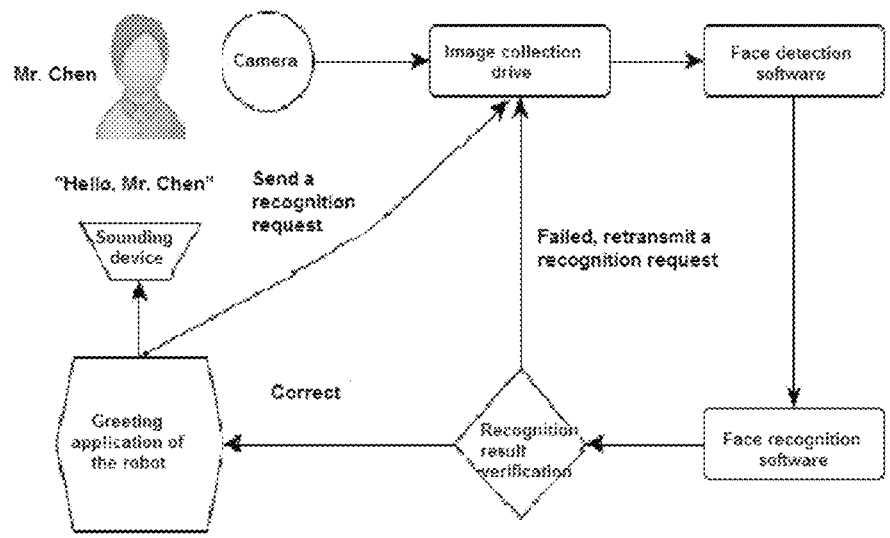

present face image. The invention can identify a face based on a fixed face pose, and it can identify a face based on a local or web server database.

18 Claims, 1 Drawing Sheet

(56) References Cited

U.S. PATENT DOCUMENTS

| | | | | |
|---|---|---|---|---|
| 2004/0252913 A1* | 12/2004 | Ahn | | G06F 1/1626 382/296 |
| 2005/0036649 A1* | 2/2005 | Yokono | | G06K 9/00221 382/100 |
| 2005/0069208 A1* | 3/2005 | Morisada | | G06K 9/00228 382/190 |
| 2006/0126918 A1* | 6/2006 | Oohashi | | G05D 1/0251 382/153 |
| 2010/0098301 A1* | 4/2010 | Zhou | | G06K 9/00201 382/118 |
| 2010/0239123 A1* | 9/2010 | Funayama | | G06T 7/0081 382/103 |
| 2012/0062688 A1* | 3/2012 | Shen | | G06F 3/04886 348/14.03 |
| 2012/0200734 A1* | 8/2012 | Tang | | H04N 5/23245 348/223.1 |
| 2012/0288165 A1* | 11/2012 | Bedros | | G06K 9/036 382/118 |
| 2012/0307049 A1* | 12/2012 | Mimar | | G08B 13/19676 348/143 |
| 2013/0039538 A1* | 2/2013 | Johnson | | G06T 7/20 382/103 |

OTHER PUBLICATIONS

International Preliminary Report on Patentability for International Patent Application No. PCT/CN2015/081403, dated Jul. 27, 2017, 12 pages.

* cited by examiner

SYSTEM AND A METHOD FOR IMAGE RECOGNITION

This patent application is a 35 U.S.C. §371 national phase filing of International Patent Application No. PCT/CN2015/081403, filed Jun. 12, 2015, and claims the benefit of Chinese Patent Application No. 201510014262.8 filed Jan. 12, 2015 in the Chinese Patent Office. The entire disclosures of International Patent Application No. PCT/CN2015/081403 and Chinese Patent Application No. 201510014262.8 are hereby incorporated herein by reference in their respective entireties.

BACKGROUND OF THE INVENTION

1. Field of the Invention

The present disclosure relates to a security field, more specifically, to a system and a method for image recognition for a robot system.

2. Description of the Related Art

Nowadays, with the increasing requirements for the security, a great number of security systems utilize password authentication for the identification. Notwithstanding, this kind of identification lacks in security, and people is easy to obtain the decryption method, thus the high-level security requirement is not satisfied. Therefore, the authentication mode through the identification of the fingerprint, iris and face is gradually adopted by the high-level security system. The human biological characteristics, such as face, fingerprint and iris, are innate, the uniqueness and the difficulty of being duplicated are necessary conditions for the identity authentication. The face recognition has peculiar features compared with other types of biological recognition, these feature are as follows:

non-obligatory: the user does not need to fit the face collection device, and the face collection device can obtain the face image when the user is unconscious, thus the collection method has no "mandatory";

non-contact: the image is collected although the user does not need to directly contact the device;

concurrency: the sorting, the determination and the identification of a plurality of faces can be executed in the application scenarios;

visual characteristic: people are identified by their faces, and the operation is simple, the result is intuitional, the stealthiness is good.

At present, the face recognition system generally comprises a camera configured to collect the face image, a light source configured to supplement light, an assistant position system or a sign configured to prompt the face collection location, a computer (such as an embedded computer) configured to execute the face recognition software, a device configured to process or display the identification result such as a reminder light, a relay configured to open the door, and a database sheet in order to record the identification results.

The face recognition system for the security system has the following issues in the application scenarios: 1. the requirement for the pose of the face collection is fixed; 2. the light condition is sensitive and should be fixed by light supplement; 3. it does not need high speed calculating cause the calculating demand is one-off.

SUMMARY OF THE INVENTION

To resolve the shortcoming of the prior art, the invention provides an image recognition system, comprises:

a robot having an image collection module, configured to drive the image collection module to collect an image in a view of the robot by the image collection drive module;

a light source configured to supplement light when the image collection module collecting an image;

a face detection module configured to locate a face image in the image collected by the image collection module;

a face recognition module configured to implement a preprocessing for the located face image, then the preprocessed face image being compared with an image feature information of a known identity contained in a database, to determine an identity information and a confidence probability of the present face image.

Preferably, the image collection module is a high definition camera, the high definition camera is capable to obtain static image and to collect at least 30 images per second; the high definition camera is connected to the robot by a MIPI or a USB interface.

Preferably, the light source comprises an ambient light source and an infrared light source;

upon utilizing the ambient light to supplement light and collecting the image by the image collection module, if the collected image can not be recognized, light is supplemented by the infrared light source.

Preferably, the preprocessing comprising:

executing an angle correction treatment and a light treatment (such as brightness normalization and polarized light correction) for the face image presenting in the image.

Preferably, the database comprises a local data memory module and a web server data memory module.

Preferably, the robot further comprises a sounding device connected to the database, the sounding device sends out various types of prompt tones according to a comparative result from the face recognition module.

Preferably, the image recognition system further comprises a record feedback device to record and/or feed back a comparative result from the face recognition module.

Preferably, the face recognition module implements a comparison by SVM algorithm.

A method for the image recognition for the above-mentioned system, comprises the steps of:

(a) collecting the image in the view of the robot by the image collection module of the robot while supplementing light by a light source as the image collection module collecting the image;

(b) using the face detection module to implement a location process to the face image presenting in the image which is collected by the image collection module;

(c) using the face detection module to implement a preprocessing for the face after being located, then comparing with an image feature information of a known identity contained in a database, to determine an identity information and a confidence probability of the present face image.

Preferably, in the above method, if the identity information of present face image is incompatible with an image feature information of a known identity in a database, execute the step (a) to step (c) continually.

BRIEF DESCRIPTIONS OF THE DRAWINGS

Referring to the accompanying drawings, the description made by the unlimited embodiments, the disclosure and the feature, outline and advantage thereof will be more obvious. The same signs in all drawings indicate the same portions and they are not drawn in proportion intentionally. It illustrates the meaning of the invention.

Figure 2:
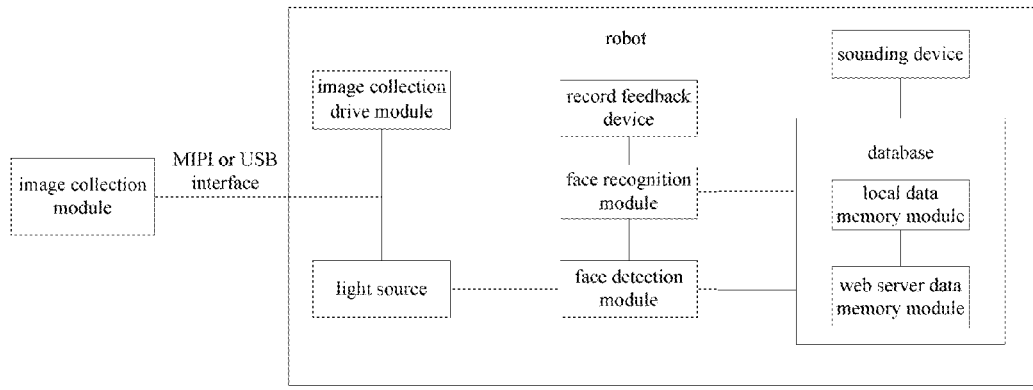

FIG. 1 shows the identity recognition system structure and the operation case thereof according to the present invention; and FIG. 2 shows the robot and the image collection module according to the present invention.

DETAILED DESCRIPTIONS

The following description provides the details to permit a better comprehension of the invention. However, it is obvious for the people skilled in the art that the invention can be implemented without any one or more details. In other examples, to avoid confusion, the known technical features in the art are not described.

To understand the invention thoroughly, the following descriptions will provide detail steps and structures to explain the technical solution for the invention. The preferred embodiment is described as follows. However, the invention has further embodiments beyond the detailed description.

Since the invention consists in a part of the robot visual system to implement the face identification, the issues in the application of the robot should be addressed. The issues comprise: 1 various poses of the face presenting in a view of the robot; 2. various light condition, including polarized light or no light supplement source; 3. real-time recognizing the face in the view of the robot that demanding a quick response, and the real-time feedback implemented through a continuous recognition in accordance with the variation of the identified face.

To resolve the above issues, the embodiment provides an image recognition system, comprising:

a robot having an image collection module, configured to drive the image collection module to collect an image in a view of the robot by the image collection drive module;

a light source configured to supplement the light when the image collection module collecting an image;

a face detection module configured to locate a face image in the image collected by the image collection module;

a face recognition module configured to implement a preprocessing for the located face image, then the preprocessed face image being compared with an image feature information of a known identity contained in a database, to determine an identity information and a confidence probability of the present face image.

In an embodiment of the invention, it is optional but unlimited that, the image collection module of the robot is a high definition camera. Preferably, the high definition camera is capable to obtain static image and to collect at least 30 images per second, to further meet the requirement of high-speed image collection. For example, even if the object in the view of the robot moves fast, the invention is also able to collect the image clearly. It is optional but unlimited that, the high definition camera is connected to the robot by a Mobile Industry Processor Interface (MIPI) or a Universal Serial Bus (USB) interface. In some optional embodiments, the robot can implement a real-time adjustment for the framing scope or angle of the image collection module through a motor. For example, if the image collection module detects people crossing within the visual scope of it, the image collection module can implement real-time tracking snapshot by the motor, such as moving with the object simultaneously and implementing the enlarged amplifying snapshot immediately, to improve the definition of the collected image.

In an embodiment of the invention, it is optional but unlimited that, the above light source includes an ambient light source and an infrared light source. The ambient light source is a build-in light source of the robot. The advantage of the ambient light source is homogeneity of the lighting. However the disadvantage of the ambient light source is that the luminance is low and it can not be directed. Furthermore, the luminance can be controlled by other high-level application, the light even be closed sometimes. Hence, the ambient light can not meet the requirement of light supplement. Because a set of infrared light-emitting device is added to the invention and is used to supplement light to the image, the lumination power is controlled by the image recognition system limitedly, to achieve stable light supplement in various scenarios. For example, when the ambient light source is used to supplement light and to collect image by the image collection module, if the collected image can not meet the requirement of the recognition, then the invention uses the infrared light source to supplement light, thus to obtain a clear image.

In an embodiment of the invention, it is optional but unlimited that, the face detection module implements the location, that is, the face position is located in the full-field image collected by the robot. In the present security system, this step is unnecessary as the position is fixed. Then preprocess the located face image by the face recognition module, the preprocessed face image is compared with an image feature information of a known identity in a database, to determine an identity information and a confidence probability of the present face image. The face recognition module can execute the angle correction treatment and the light treatment (such as brightness normalization and polarized light correction) for the face image presented in the image. Due to the great change of the ambient and angle of the face collection, the invention increases the recognition rate through the execution of the angle correction treatment for the face image collected and located by the face detection module. Meanwhile, the embedded recognition technology also can process the light of the image, to facilitate the comparison and to increase the accuracy.

In an embodiment of the invention, it is optional but unlimited that, the above database includes a local data memory module and a web server data memory module. Based on the embedded system of the robot, the local data memory module adopts the face recognition technology according to the feature matching. Firstly, the local data memory module makes the feature database of the face image of a known identity, secondly it extracts a same type of feature according to the face image of the real-time collection, comparing the feature distance of the present face to the feature distance of the database face through a math distance function. Finally, it determines the possible identity, and gives out the confidence probability. Since the web server data memory module has more computing resources and more flexible application architectures, it adopts the face recognition technology based on a deep learning model which is configured to generate the face feature in the database, to construct the face category in the database by SVM (Support Vector Machine) algorithm or other standard classifiers. Then it calculates the model feature according to the face image of the real-time collection, and determines the identity and confidence probability of the face image by the classifier. The recognition technology of the embedded feature matching supports the identification of 20-50 people. In a certain variation range of light and angle, the recognition accuracy rate of 20 people is greater than 90%, the recognition accuracy rate of 50 people is greater than 80%, The recognition technology on the server based on the deep learning supports the recognition from 50 people to hundreds people at least, and the recognition accuracy rate is greater than 97%.

In an embodiment of the invention, it is optional but unlimited that, the robot has a sounding device connected to the above database, the sounding device sends out various types of prompt tones according to a comparative result from the face recognition module. For example, if the face recognition module has a correct comparison, the sounding device gets the prompt tones corresponding to the present face image in the database, such as "Hello, Mr. Chen". If the regarded identification has failed after crosschecks, the greeting application still can sends out a general greeting without the identify information, such as sending out a simple "Hello" by the sounding device. In an optional embodiment, the invention can be connected to the access control system. If the identification succeeds, the access is allowed, otherwise if the identification fails, the access is not allowed.

In an embodiment of the invention, it is optional but unlimited that, the image recognition system provided by the invention further comprises a record feedback device to record and/or feed back a comparative result from the face recognition module. It is an optional member, the record function and the feedback function don't need to be implemented simultaneously. In some scenarios, only one of them is needed.

Meanwhile, the invention also provides a recognition method by the above-mentioned image recognition system, comprising the steps of:

(a) collecting the image in the view of the robot by the image collection module of the robot, and supplementing light through a light source as the image collection module collecting the image;

(b) using the face detection module to implement a location process to the face image presenting in the image which is collected by the image collection module;

(c) using the face detection module to implement a preprocessing for the face image after being located, then comparing with an image feature information of a known identity contained in a database, to determine an identity information and a confidence probability of the present face image.

If the identity information of present face image is incompatible with an image feature information of a known identity in a database, execute the step (a) to step (c) continually.

FIG. 1 illustrates completely the operation process of the identity recognition system: firstly, the greeting application of the robot sends a recognition request to the image collection drive module, the image collection drive module accepts the request, and transmits the image sent from the camera to the face detection module. The detection software truncates the located face image and executes the preprocess, and then sends the processed image to the face recognition module. The face recognition module transmits the recognition result to the result verification module, the system executes the corresponding operation according to the determining result. If the result is correct, the result is sent to the greeting application, and the application utilizes the sounding device to greet the user in the image of the camera according to the recognized identity; if the result is wrong, the system retransmits the recognition request to the image collection drive, and reenters into the recognition procedure. The main point of the determination of the recognition result verification module depends on the confidence probability of the transmitting result of the face recognition software. In the worst case, when the identification fails, the times of retransmitting request is controlled by the greeting application according to a request time out, to determine whether the request has to be retransmitted. If the correct result is not obtained after the identification is time out, the identification is failed. Then the greeting application still can sends out a general greeting without identify information, such as a simple "Hello".

Therefore, as the invention adopts the above technical solution, the invention does not need fixed the face pose to identify a face. Meanwhile, the invention can identify a face based on a local or web server database, and it increases the accuracy of the identification. Furthermore, the face recognition procedure meets the real-time requirement through the suitable camera, the operation hardware module and the operation frame.

While the present disclosure has been described in connection with certain exemplary embodiments, it is to be understood that the invention is not limited to the disclosed embodiments, the device and structure, which are not specifically described, should be understood as the common manner in the art to be implemented; any people skilled in the art can make possible changes and modifications, or equivalents thereof for the technical solution of the invention according to the above method without falling out of the scope of the invention. Therefore, the various modifications and equivalent arrangements without departing away from the technical solution of the invention, are included within the spirit and the scope of the technical solution of the invention.

What is claimed is:

1. An image recognition system, comprising:
   a robot, having an image collection module, configured to drive the image collection module to collect an image in a view of the robot by an image collection drive module;
   a light source configured to emit light only while the image collection module is collecting an image;
   a face detection module configured to locate a face image in the image collected by the image collection module;
   a face recognition module configured to implement a preprocessing for the located face image, then the preprocessed face image being compared with an image feature information of a known identity contained in a database, to determine an identity information and a confidence probability of the face image;
   wherein, the database comprises:
      a local data memory module that adopts a face recognition technology according to a feature matching; wherein firstly, the local data memory module makes a feature database of the face image of the known identity; secondly, it extracts a same type of feature according to the face image of a real-time collection, comparing a feature distance of a present face to a feature distance of a database face through a math distance function; finally, it determines a possible identity, and gives out the confidence probability; and
      a web server data memory module, wherein the web server data memory module adopts the face recognition technology based on a deep learning model which is configured to generate a face feature in the database, to construct a face category in the database by support vector machine (SVM) algorithm or other standard classifiers; then the web server data memory module having computing resources calculates a model feature according to the face image of the real-time collection, and determines the possible identity and confidence probability of the face image by the classifier.

2. The image recognition system as claimed in claim 1, wherein the image collection module is a high definition camera, the high definition camera is configured to collect a static image and to collect at least 30 frames per second of video; and wherein the high definition camera is connected to the robot by a mobile industry processor interface (MIPI) or a universal serial bus (USB) interface.

3. The image recognition system as claimed in claim 1, wherein the light source comprises an ambient light source and an infrared light source; and wherein upon utilizing the ambient light to emit light and collecting the image by the image collection module, if the collected image can not be recognized, light is emitted by the infrared light source.

4. The image recognition system as claimed in claim 1, the preprocessing comprising:

executing an angle correction treatment and a light treatment for the face image presenting in the image.

5. The image recognition system as claimed in claim 1, wherein the robot further comprises a sounding device connected to the database, wherein the sounding device sends out various types of prompt tones according to a comparative result from the face recognition module.

6. The image recognition system as claimed in claim 1, further comprising a record feedback device to record and/or feed back a comparative result from the face recognition module.

7. The image recognition system as claimed in claim 1, wherein the face recognition module implements a comparison by the SVM algorithm.

8. An image recognition method, using an image recognition system comprising:

a robot having an image collection module, configured to drive the image collection module to collect an image in a view of the robot by an image collection drive module;

a light source configured to emit light only while the image collection module is collecting an image;

a face detection module configured to locate a face image in the image collected by the image collection module; and a face recognition module configured to implement a preprocessing for the located face image, then the preprocessed face image being compared with an image feature information of a known identity contained in a database, to determine an identity information and a confidence probability of the face image;

wherein the method comprises the steps of:

(a) collecting the image in the view of the robot by the image collection module of the robot while emitting light by the light source only while collecting the image;

(b) using the face detection module to implement a location process to the face image presenting in the image which is collected by the image collection module;

(c) using the face detection module to implement a preprocessing for the face image after being located, then comparing with the image feature information of the known identity contained in the database, to determine the identity information and the confidence probability of the face image, by:

adopting, by a local data memory module, a face recognition technology according to a feature matching, by:

making, by the local data memory module, a feature database of the face image of the known identity;

extracting a same type of feature according to the face image of a real-time collection;

comparing a feature distance of a present face to a feature distance of a database face through a math distance function;

determining a possible identity, and giving out the confidence probability;

adopting, by a web server data memory module, the face recognition technology based on a deep learning model, which is configured to generate a face feature in the database, to construct a face category in the database by support vector machine (SVM) algorithm or other standard classifiers;

calculating, via computing resources in the web server data memory module, a model feature according to the face image of the real-time collection; and determining the possible identity and confidence probability of the face image by the classifier.

9. The image recognition method as claimed in claim 8, wherein the image collection module is a high definition camera, the high definition camera is configured to collect a static image and collect at least 30 frames per second of video; and wherein the high definition camera is connected to the robot by a mobile industry processor interface (MIPI) or a universal serial bus (USB) interface.

10. The image recognition method as claimed in claim 8, wherein the light source comprises an ambient light source and an infrared light source; and wherein upon utilizing the ambient light to emit light and collecting the image by the image collection module, if the collected image can not be recognized, light is emitted by the infrared light source.

11. The image recognition method as claimed in claim 8, the preprocessing comprising:

executing an angle correction treatment and a light treatment for the face image presenting in the image.

12. The image recognition method as claimed in claim 8, wherein the robot further comprises a sounding device connected to the database, wherein the sounding device sends out various types of prompt tones according to a comparative result from the face recognition module.

13. The image recognition method as claimed in claim 8, further comprising:

making a determination that an image feature information of the face image is incompatible with the image feature information of the known identity; and based on the determination, repeating steps (a)-(c).

14. The image recognition method as claimed in claim 9, further comprising:

making a determination that an image feature information of the face image is incompatible with the image feature information of the known identity; and based on the determination, repeating steps (a)-(c).

15. The image recognition method as claimed in claim 10, further comprising:

making a determination that an image feature information of the face image is incompatible with the image feature information of the known identity; and based on the determination, repeating steps (a)-(c).

16. The image recognition method as claimed in claim 11, further comprising:
   making a determination that an image feature information of the face image is incompatible with the image feature information of the known identity; and
based on the determination, repeating steps (a)-(c).

17. The image recognition method as claimed in claim 8, further comprising:
   making a determination that an image feature information of the face image is incompatible with the image feature information of the known identity; and
based on the determination, repeating steps (a)-(c).

18. The image recognition method as claimed in claim 12, further comprising:
   making a determination that an image feature information of the face image is incompatible with the image feature information of the known identity; and
   based on the determination, repeating steps (a)-(c).

* * * * *